United States Patent
Haas et al.

(10) Patent No.: US 12,143,134 B2
(45) Date of Patent: Nov. 12, 2024

(54) METHODS AND APPARATUSES FOR DOWNCONVERTING HIGH FREQUENCY SUBBANDS AND ISOLATING SIGNALS THEREIN

(71) Applicant: The Government of the United States, as represented by the Secretary of the Navy, Washington, DC (US)

(72) Inventors: Bryan Haas, Arnold, MD (US); Jason McKinney, Bowie, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/958,276

(22) Filed: Sep. 30, 2022

(65) Prior Publication Data

US 2023/0098464 A1    Mar. 30, 2023

Related U.S. Application Data

(60) Provisional application No. 63/250,404, filed on Sep. 30, 2021.

(51) Int. Cl.
*H04L 25/08*   (2006.01)
*H04B 1/10*   (2006.01)
*H04B 10/50*   (2013.01)

(52) U.S. Cl.
CPC ......... *H04B 1/1036* (2013.01); *H04B 10/505* (2013.01)

(58) Field of Classification Search
CPC ... H04L 7/0075; H04L 1/206; H04L 27/2627; G02B 12/57; G02B 6/243; G02B 6/00;
(Continued)

(56) References Cited

U.S. PATENT DOCUMENTS

| 5,644,664 A | * | 7/1997 | Burns | G02F 1/2255 385/2 |
| 11,223,432 B1 | * | 1/2022 | Aljohani | H04B 17/30 |

(Continued)

*Primary Examiner* — Khai Tran
(74) *Attorney, Agent, or Firm* — US Naval Research Laboratory

(57) ABSTRACT

Methods and apparatuses for downconverting high frequency subbands to a lower frequency band and recovering signals-of-interest. The system includes a controller, a signal generator, an optical source, a dual-drive mach zehnder modulator (DDMZM), a photodetector, and a dechipping/image (DI) rejector. The controller outputs chipping frequencies to the signal generator which generates local oscillator (LO) tones shifted by the respective chipping frequencies. The optical source outputs an optical signal to the DDMZM which has first and second arms and modulators. The first modulator receives a signal from a source and modulates it onto the optical signal propagating through the first arm to form a first modulated optical signal. The second modulator receives the shifted local oscillator tones and modulates them onto the optical signal propagating through the second arm to form a second modulated optical signal. The DDMZM outputs a signal which is a combination of the first and second modulated optical signals to the photodetector which generates a corresponding electrical signal. The dechipping/image (DI) rejector receives the electrical signal and one of the chipping frequencies and outputs a signal that maximizes signals in one high frequency subband while suppressing signals in other high frequency subbands.

6 Claims, 12 Drawing Sheets

Codes or Chipping Frequencies

(58) Field of Classification Search
CPC ..... G02B 6/4206; G02F 1/212; G02F 1/2255; G02F 1/225; H04B 10/2575; H04B 17/30
USPC .............................................. 375/346; 385/3
See application file for complete search history.

(56) References Cited

U.S. PATENT DOCUMENTS

| | | |
|---|---|---|
| 11,480,845 B2 | 10/2022 | Haas |
| 2012/0140809 A1* | 6/2012 | Krause .................... H04L 1/206 375/224 |
| 2013/0236187 A1* | 9/2013 | Middleton ............. H04B 10/00 398/116 |
| 2020/0081314 A1* | 3/2020 | Parvizi .................. G02F 1/2255 |

* cited by examiner

METHODS AND APPARATUSES FOR DOWNCONVERTING HIGH FREQUENCY SUBBANDS AND ISOLATING SIGNALS THEREIN

CROSS-REFERENCE TO RELATED APPLICATIONS

This application claims priority to U.S. Patent Application No. 63/250,404, filed Sep. 30, 2021, the contents of which are incorporated by referenced herein in their entirety.

BACKGROUND

Field of the Invention

The present application relates generally to downconverting high frequency subbands and isolating signals therein.

Description of Related Art

There are at least two components in a communications system: a source and a receiver. A receiver is designed to receive analog signals within a certain frequency range and turn those analog signals into digital signals. Modern receivers can receive and process signals with a frequency range that is hundreds of megahertz (MHz) wide, but to date they cannot receive and process gigahertz (GHz) signals which are used in some forms of communications and other applications (e.g., RADAR). This is due to the nature of converting an analog signal to a digital signal. To convert an analog signal into a digital signal, the analog signal must be sampled. Sampling is where the value of the analog signal is recorded at discrete instances of time. The result of a sampling operation is a digital version of the analog signal. It may be possible to reconstruct the analog signal from the digital signal if the sampling rate was greater than the Nyquist frequency, which is twice the highest frequency present in the analog signal. For gigahertz signals, this requires a very high sampling rate which is a significant barrier. One way to overcome this barrier is to downconvert the analog signal. Downconversion, in general, means to lower the frequency of a signal without altering the information it carries. This may be accomplished by using a local oscillator (LO). The LO is a continuous signal of a particular known frequency. Subtracting a signal block, i.e. some range of frequencies or bandwidth, from the LO results in a new signal block which contains the same information but is at a lower frequency. If there are multiple signal blocks at high frequency ranges, those blocks may be translated to a lower frequency range by using multiple LOs in a technique called bandwidth compression or folding. However, there are some drawbacks to this approach. The signals within these frequency bands can overlap and interfere with each other in the lower frequency range. This makes it difficult to later separate out signals of interest. It would be desirable to have an apparatus and technique that could isolate signals corresponding to one of the high frequency subbands after they have been folded into the lower frequency range.

SUMMARY OF THE INVENTION

One or more the above limitations may be diminished by structures and methods described herein.

In one embodiment, an apparatus for downconverting high frequency subbands to a lower frequency band and recovering signals-of-interest is provided. The system includes a controller, a signal generator, an optical source, a dual-drive mach zehnder modulator (DDMZM), a photodetector, and a dechipping/image (DI) rejector. The controller outputs chipping frequencies to the signal generator which generates local oscillator (LO) tones shifted by the respective chipping frequencies. The optical source outputs an optical signal to the DDMZM which has first and second arms and modulators. The first modulator receives a signal from a source and modulates it onto the optical signal propagating through the first arm to form a first modulated optical signal. The second modulator receives the shifted local oscillator tones and modulates them onto the optical signal propagating through the second arm to form a second modulated optical signal. The DDMZM outputs a signal which is a combination of the first and second modulated optical signals to the photodetector which generates a corresponding electrical signal. The dechipping/image (DI) rejector receives the electrical signal and one of the chipping frequencies and outputs a signal that maximizes signals in one high frequency subband while suppressing signals in other high frequency subbands.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1:
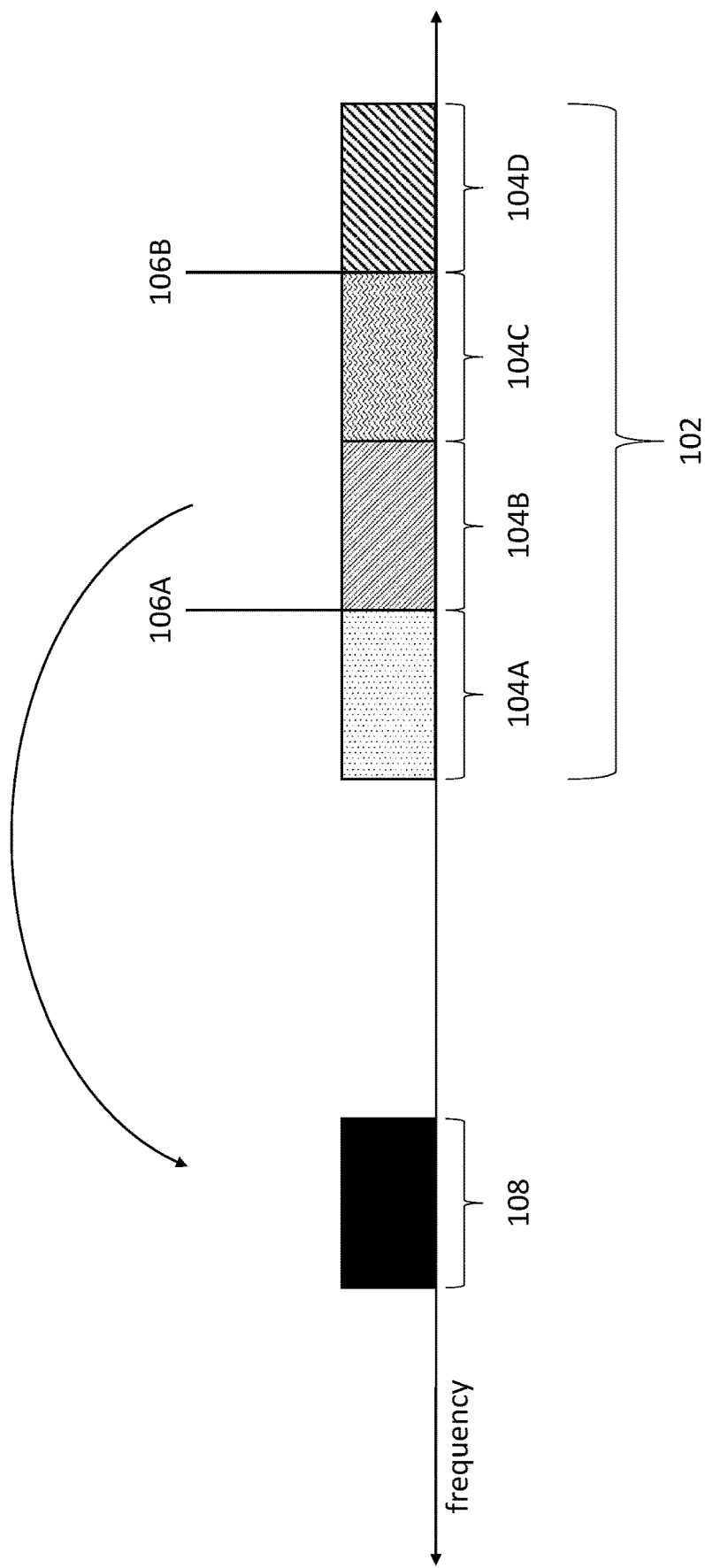
FIG. 1 is a generic illustration of a downconversion process.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are methods and apparatuses for downconverting higher frequency bandwidths, or subbands, to a lower frequency bandwidth and then isolating, or maximizing, signal(s) of interest corresponding to one high frequency subband while suppressing signals corresponding to the other high frequency subbands.

FIG. 1 illustrates the process of downconverting a certain bandwidth 102, i.e. a range of frequencies, which is at a relatively high frequency to a lower bandwidth 108, i.e., a lower frequency range. As noted above, to digitally sample a signal the sampling rate must be at least twice the highest frequency expected in the signal. If one considers that the maximum clock rate for a CPU, at the time this application is filed, is 8.4 GHz and one simplistically assumes that this equates to the sampling rate, then the maximum frequency that can be included in a digital sample of an analog signal is approximately 4.2 GHz. However, such systems would be incredibly costly and complex to operate. Moreover, there are numerous systems that generate or receive analog signals with frequencies well above 4.2 GHz that could not be processed. One example is microwave frequencies which range from 300 MHz to 300 GHz. Microwave systems would thus benefit from the techniques, systems, and apparatuses described herein. Of course, as one of ordinary skill in the art will recognize, the precise bandwidth over which the technique described herein is applied will depend upon the hardware that it is being implemented on. For example, if the receiver is only capable of receiving signals up to 100 GHz, then the analog signal will not include any signals-of-interest above 100 GHz. In addition, the intended application may narrow the bandwidth over which the technique is applied. For example, a K-band RADAR system may operate over a frequency range of 18-26.5 GHz. If one is interested in applying the techniques disclosed herein to analog signals received by a K-band RADAR system, then the frequency range over which the technique is applied may be limited to the 18-26.5 GHz, or even smaller subbands within that frequency range. In another example, a weather RADAR may operate in the S band corresponding to 2-4 GHz, which is a much smaller range than that used in a K-band RADAR system. One of the advantages of the techniques described herein, is that the system designer may choose a frequency range which corresponds to the hardware available and the intended purpose of the system. However, there are no arbitrary limits on the size of bandwidth 102. In practice, however, the system designer will be interested in signals with far narrower range than the entire microwave frequency range.

For purposes of illustration, and not by way of limitation, for the example shown in FIG. 1 the bandwidth 102 corresponds to a frequency range of 13150-13310 MHz or 13.15-13.31 GHz. As shown in FIG. 1, bandwidth 102 is further subdivided into four equally spaced bandwidths 104A, 104B, 104C, and 104D each of which, in this illustrative embodiment, are 40 MHz wide. Each subband 104A, 104B, 104C, and 104D is adjacent to a local oscillator (LO) tone. Thus, subbands 104A and 104B are centered around LO tone 106A which, in this illustrative embodiment, is 13190 MHz. Subbands 104C and 104D are centered around LO tone 106B which, again in this illustrative embodiment, is 13270 MHz.

Local oscillator tones 106A and 106B are used, as described below, to fold bandwidth 102 into a lower frequency range, called the intermediate frequency bandwidth (IFBW) 108. However, this folding process causes signals-of-interest, tones, and noise in subbands 104A, 104B, 104C, and 104D to overlap within IFBW 108 creating a signal origami which makes it difficult to isolate any one signal-of-interest. As described below, however, the signals-of-interest can be recovered by encoding the LO tones 106A and 106B using chipping codes or chipping frequencies and then using those codes or frequencies and image rejection techniques to isolate a particular subband while suppressing signals and noise from other subbands. The result, as described in detail below, reveals any signal-of-interest that may be present in the isolated subband. One of the advantages of this system, is that the encoding of the LO tones 106A and 106B is done at the receiver side of the transmission system as opposed to the transmitter. This means that no modification of an existing transmitter is required, and it is not necessary to encode LO tones in the transmitted signal.

While FIG. 1 shows four distinct subbands and two LO tones, this is merely exemplary. As one of ordinary skill in the art will recognize, additional subbands could be folded into IFBW 108 by using additional LO tones. For example, eight subbands could be folded into IFBW 108 by using four LO tones. In general, the number of subbands that can be folded into an IFBW is twice the number of LO tones employed. However for simplicity of illustration, and explanation, an embodiment where two LO tones (106A and 106B) and four subbands (104A-D) constituting bandwidth 102 is discussed in detail below.

Figure 2:
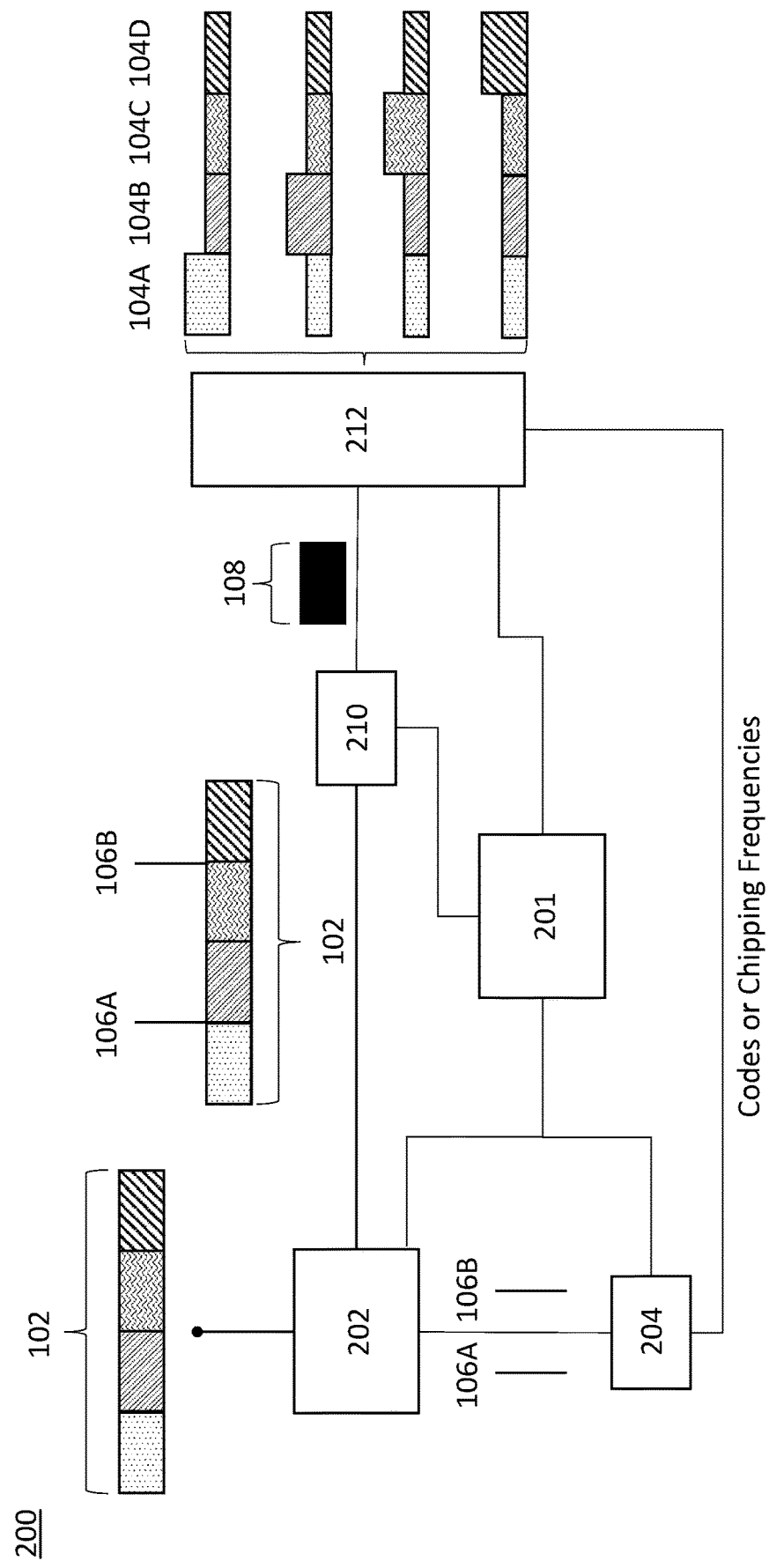
FIG. 2 a schematic diagram of a receiver system according to one embodiment.

FIG. 2 is a schematic illustration of a receiver system 200 according to one embodiment. For purposes of comprehension and illustration, FIG. 2 includes graphical illustrations of bandwidth 102, LO tones 106A and 106B, the combination of bandwidth 102 and LO tones 106A and 106B, the folding of the same into IFBW 108, and the subsequent isolation/suppression of subbands 104A-D each of which is juxtaposed with a corresponding component in FIG. 2. A controller 201 is responsible for the overall control and operation of system 200. Controller 201 may be a CPU, microcomputer, or microcontroller that includes or is operably connected to memory storing program instructions for the overall execution and control of the techniques described herein. Furthermore, controller 201 is connected to an I/O interface that allows for control signals to be sent to and/or received from devices connected to controller 201 either through a wired or wireless connection. In addition, as one of ordinary skill in the art will recognize one or more of the components depicted herein require power to operate, but for simplicity of illustration the power connections are omitted from the figures. Nevertheless, the requisite power could be provided by an internal source, such as a battery, or from an external source. One or more signals-of-interests in bandwidth 102 are received and provided to a combiner 202. Encoded LO tones 106A and 106B are generated by signal generator 204 in accordance with instructions from controller 201. In one embodiment, discussed below, signal generator 204 receives chipping codes from controller 201 and those chipping codes are single-sideband modulated onto LO tones 106A and 106B. As one of ordinary skill will appreciate, a chipping code is a sequence of bits that is analyzed to determine whether a single data bit is a "1" or a "0", thus allowing data to transmitted even if some of the bit stream is lost in transmission. For example, instead of transmitting a "1" a sequence of 1s and 0s may be transmitted to signify the "1", e.g., 00110011011. Similarly, instead of transmitting a "0" a sequence such as 11001100100 may be transmitted. In this example, the sequence for "0" is the opposite of the sequence for "1". Thus, even if one bit is lost in transmission—but at least a minimum number of the others bits are recovered—the receiver will be able to differentiate whether the sequence corresponds to a "1" or a "0". By modulating chipping codes onto the LO tones generated by the signal generator 204, it is possible to create encoded LO tones 106A and 106B.

Those chipping codes can later be used to dechip the output of the photodetector 210, which is the folded intermediate frequency bandwidth. In effect, by encoding the LO tones with the chipping codes, the receiver is able to then use the chipping codes and image rejection techniques to isolate signals corresponding to a particular higher frequency subband while suppressing signals from other subbands. In another embodiment, instead modulating a chipping code LO tones 106A and 106B, signal generator 204 applies a unique frequency offset—a chipping frequency—in accordance with an instruction from controller 201, to each of the LO tones to generated the encoded LO tones 106A and 106B. Like with the chipping codes, the unique frequency offsets allow the receiver system to isolate signals corresponding to a particular subband while suppressing others.

Returning to FIG. 2, the encoded LO tones 106A and 106B and the received signals within bandwidth 102 are mixed in combiner 202. In one embodiment, the combiner 202 is a dual-drive mach zehnder modulator (DDMZM), but other non-optical devices could do the same. For example, radio-frequency (RF) combiners and mixers may be used to combine receive RF bands with local oscillator tones and produce an electrical signal as an output, negating the need for a photodetector 210. But in this embodiment, the output of the combiner 202 is provided to a photodetector 210 whose output is the IFBW 108. The IFBW 108 contains all of the signals within bandwidth 102, but at a lower intermediate frequency. For example, if the bandwidth 102 corresponds to a frequency range of 13150-13310 MHz and the encoded LO tones 106A and 106B have frequencies of 13190 MHz and 13270 MHz, then the frequency range of IFBW is 120-360 MHz. The IFBW 108 is then provided to a dechipping/image (DI) rejector 212. DI rejector 212 receives either the chipping codes or chipping frequencies, depending upon the embodiment, and uses the same to implement Hartley image rejection to isolate signals corresponding to one of the subbands 104A-104D in the IFBW 108, while suppressing others. Having described the general arrangement of system 200, different embodiments of system 200 will be discussed below. One embodiment, represented in FIGS. 3A and 3B, uses chipping codes to encode the LO tones, while another embodiment, represented in FIGS. 4A and 4B, uses chipping frequencies to encode the LO tones.

Figure 3A:
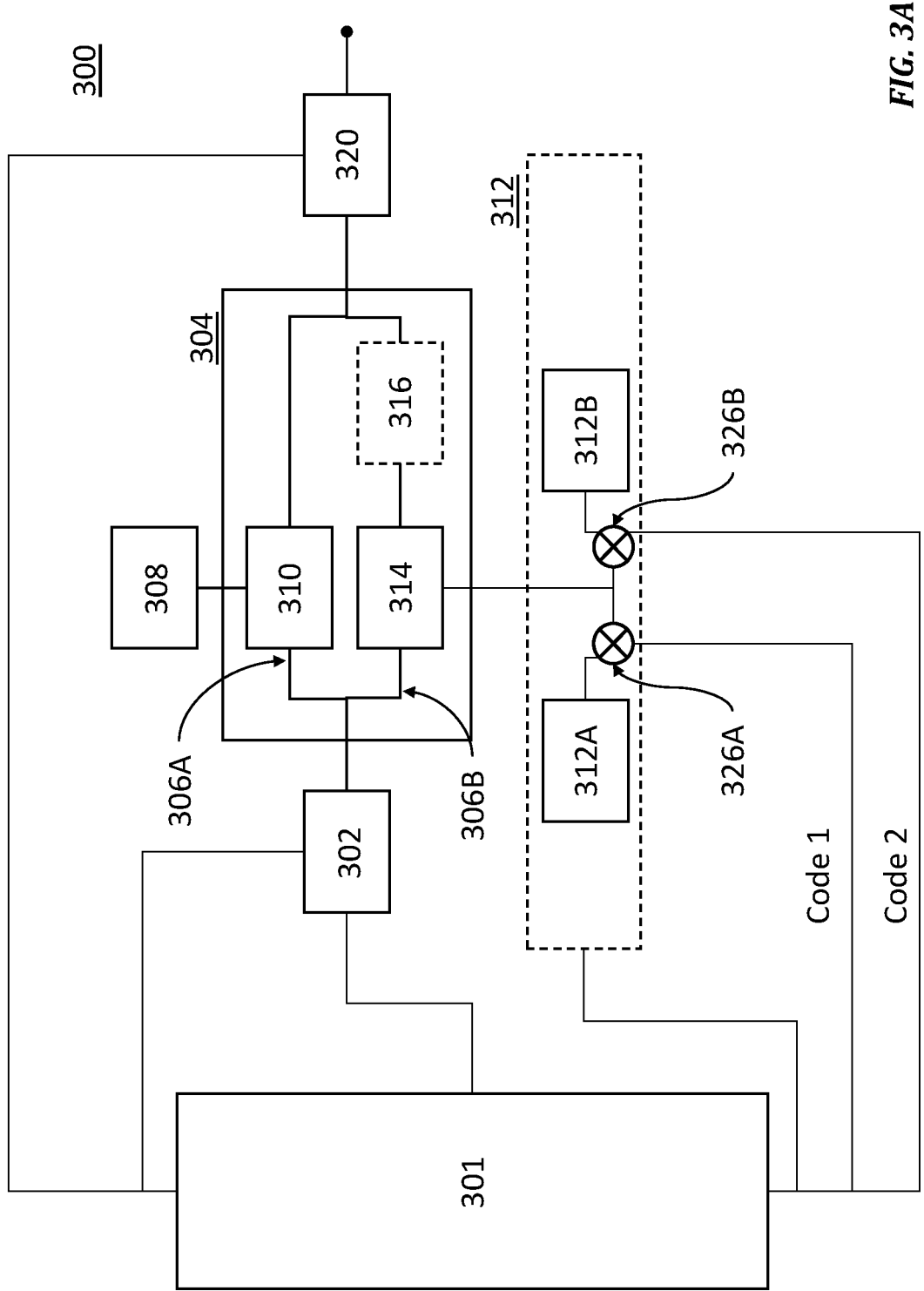
FIG. 3A is schematic diagram of a receiving/mixer side 300 of a receiver system according to one embodiment.
Figure 3B:
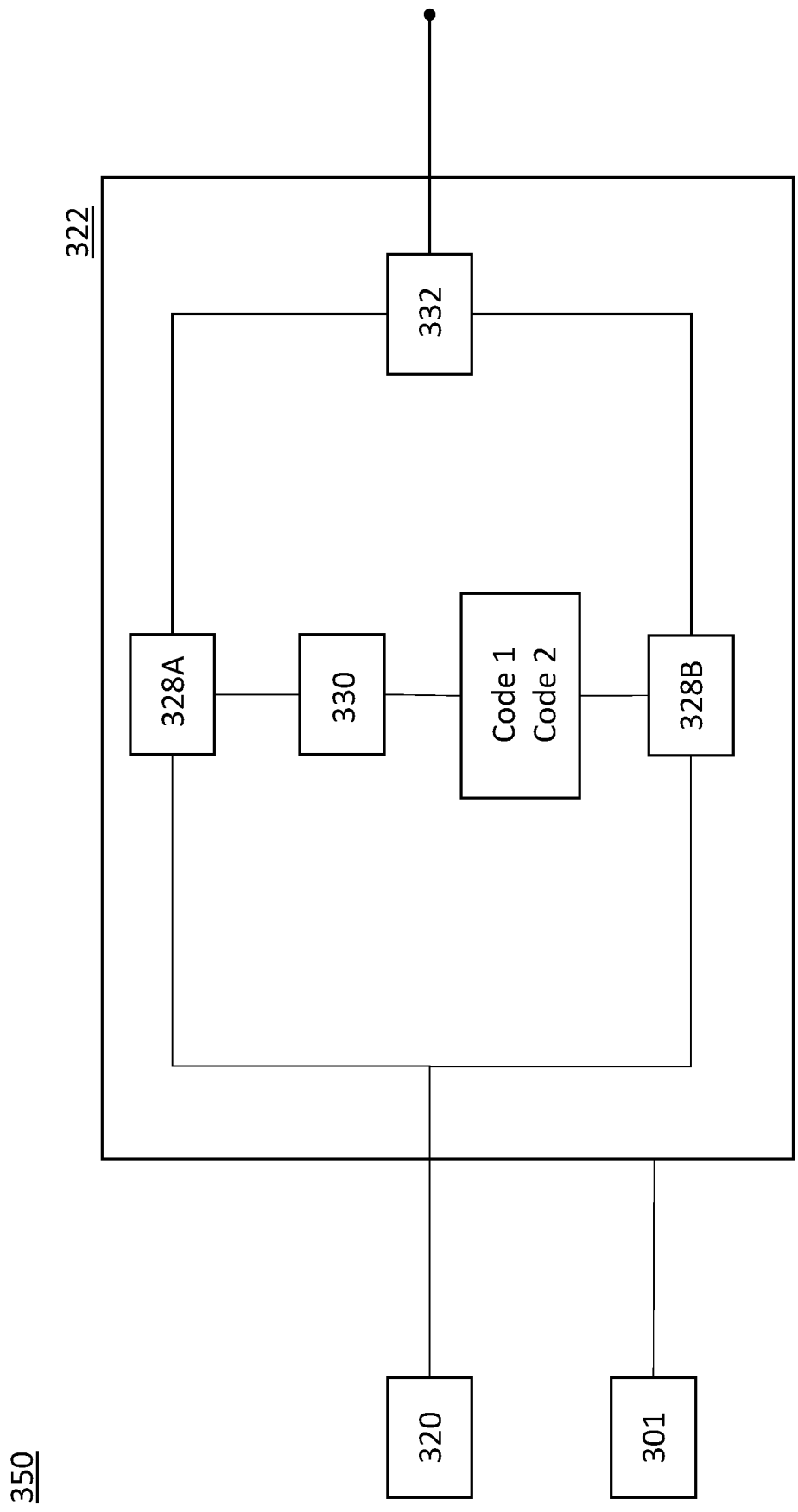
FIG. 3B is a schematic diagram of a dechipping/image rejection side 350 of the receiver system according to one embodiment.

FIGS. 3A and 3B are schematic illustrations of a receiver system comprising a receiving/mixer side 300 (FIG. 3A) and a DI rejection side 350 (FIG. 3B), respectively. For simplicity of understanding, photodetector 320 is shown in FIGS. 3A and 3B to provide a clear indication of the interrelationship between sides 300 and 350. FIG. 3A is a schematic illustration of the receiving/mixing side 300. As shown in FIGS. 3A and 3B, a controller 301 provides for overall control of the receiving/mixer side 300 and the dechipping/image rejection side 350. Controller 301 is substantially the same as controller 201 discussed above, and thus a detailed description of controller 301 is omitted for brevity. Controller 301 controls an optical source 302 to emit an optical signal and provide the same to a dual-drive Mach-Zehnder modulator (DDMZM) 304. DDMZM 304 includes two optical waveguide arms 306A and 306B through which the optical signal propagates. A first coupler (not shown) receives the input optical signal from the optical source 302 and divides the signal into two optical signals which propagate through arms 306A and 306B, respectively. In this embodiment, arms 306A and 306B are formed from an electro-optic material that can retard the optical carrier phase at the required microwave frequencies. In one embodiment, arms 306A and 306B comprises an electro-optic polymer waveguide. In another embodiment, arms 306A and 306B are formed from lithium niobate LiNbO3. A received signal is captured by a receiver 308 and provided to a modulator 310 which applies an electric field to arm 306A in accordance with the received signal. As discussed above, in a preferred embodiment the received signal is a microwave signal that may include one or more individual signals with a certain frequency bandwidth such a bandwidth 102. Applying an electric field to arm 306A in accordance the received signal modifies the refractive index of the optical waveguide material forming arm 306A causing a change in phase of the optical signal travelling through arm 306A.

Controller 301 also controls a signal generator 312. Controller 301 generates the chipping codes (designated Code 1 and Code 2 in FIG. 3A) and provides the same to signal generator 312. In an exemplary embodiment, Code 1 may be 1010 and Code 2 maybe 1100. Here, since the controller 301 is in close proximity to signal generator 312 and the risk of signal loss is small, a 4-bit code is sufficient to encode the local oscillator tones produced by signal generator 312 and thus distinguish the encoded local oscillator tones 106A and 106B from each other. The chipping codes output by controller 301 are provided to mixers 326A and 326B, respectively. Mixers 326A and 326B also receive, respectively, the evenly spaced local oscillator tones from tone generators 312A and 312B. Here, tone generators 312A and 312B are represented as separate structures within signal generator 312 to indicate that the signal generator 312 is constructed to output two tones at different frequencies to mixes 326A and 326B. As one of ordinary skill will appreciate, the signal generator 312 may have an internal controller, memory, and other hardware operably connected to generate two or more tones and I/O hardware to receive instructions, codes, and frequencies from controller 301 and to output tones to mixers 326A and 326B. An exemplary signal generator 312 is a Keysight MXG-series signal generator. The now encoded local oscillator tones 106A and 106B are provided to modulator 314. Modulator 314 applies an electric field to arm 306B in accordance with the encoded LO tones 106A and 106B from mixers 326A and 326B which modifies the refractive index of the optical waveguide material forming arm 306B resulting in a change in phase of the optical signal travelling through arm 306B. In one embodiment, a DC bias source 316 may be placed downstream of modulator 214 in the optical path. The modulated optical signals from the two arms 306A and 306B are combined in a second coupler (not shown) and provided as an output signal from the DDMZM 304. In the embodiment shown in FIG. 3A, the output of DDMZM 304 is provided directly to a photodetector 320, which may be a photodiode. However, in another embodiment, the output of DDMZM 204 may be provided to a bandpass filter (not shown) and then provided to the photodetector 220. If the receiver system is design to receive a particular bandwidth or focus on a particular bandwidth, then the bandpass filter may constructed to isolate that particular bandwidth thereby eliminating extraneous signals and noise. Photodetector 220 essentially converts the optical signal to an electrical signal.

Turning to FIG. 3B, the electrical signal output from photodetector 320 is in the intermediate frequency bandwidth (IFBW) 108 and contains mixed up copies of any signals-of-interest received by receiver 308 and the encoded LO tones 106A and 106B. The output from photodetector 320 is provided to a dechipping/image (DI) rejector 322. The DI rejector 322 is constructed to receive the output from photodetector 320 (corresponding to the IFBW 108) and perform Hartley-type image rejection using the chipping codes generated by controller 301. More specifically, the output from photodetector 320 is split by a signal splitter (not shown) and provided to combiners 328A and 328B where it is mixed with an in-phase (I) or quadrature phase (Q) version of one of the chipping codes.

Controller 301 sends a chipping code to the DI rejector 322 in accordance with the subbands one seeks to isolate. For example, if one is seeking to isolate a signal-of-interest that maybe present in the lower sideband 104A or upper sideband 104B, then controller 301 outputs the chipping code (Code 1) used to encode LO tone 106A to the DI rejector 322. If one is seeking isolate a signal-of-interest that maybe present in the lower sideband 104C or upper sideband 104D, then controller 301 outputs the chipping code (Code 2) used to encode LO tone 106B to the DI rejector. The chipping code provided by controller 301 is then passed to a combiner 328B and a 90° phase-shifter 330 to create in-phase and quadrature phase versions of the encoded LO tone 106A. The in-phase and quadrature phase versions of the received chipping code are then mixed with the output of photodetector 320 at mixers 328A and 328B. The output of mixers 328A and 328B are then combined in a low-frequency 90° combiner 332 to alternately reject one or the other sideband depending on whether the Q chipping code was set to 90 or 270 degrees. Signals corresponding to the isolated sideband which is not rejected are maximized while signals in the other sidebands are suppressed. Thus, if one seeks to isolate signals in subband 104A, the chipping code (Code 1) used to generate LO tone 106A is provided to the DI rejector 322, and then the appropriate phase is selected. Signals from subband 104A are then maximized while signals from the other subbands 104B, 104C, and 104D are suppressed. To isolate and maximize sidebands associated with LO tone 106B, the same process may be followed except controller 301 provides the other chipping code (Code 2) to the DI rejector 322 the above process is repeated. Once again, depending on whether the Q chipping code was set to 90 or 270 degrees, signals corresponding to one of the sidebands 104C or 104D surrounding LO tone 106B are maximized while other signals from the other sidebands are suppressed.

Figure 4A:
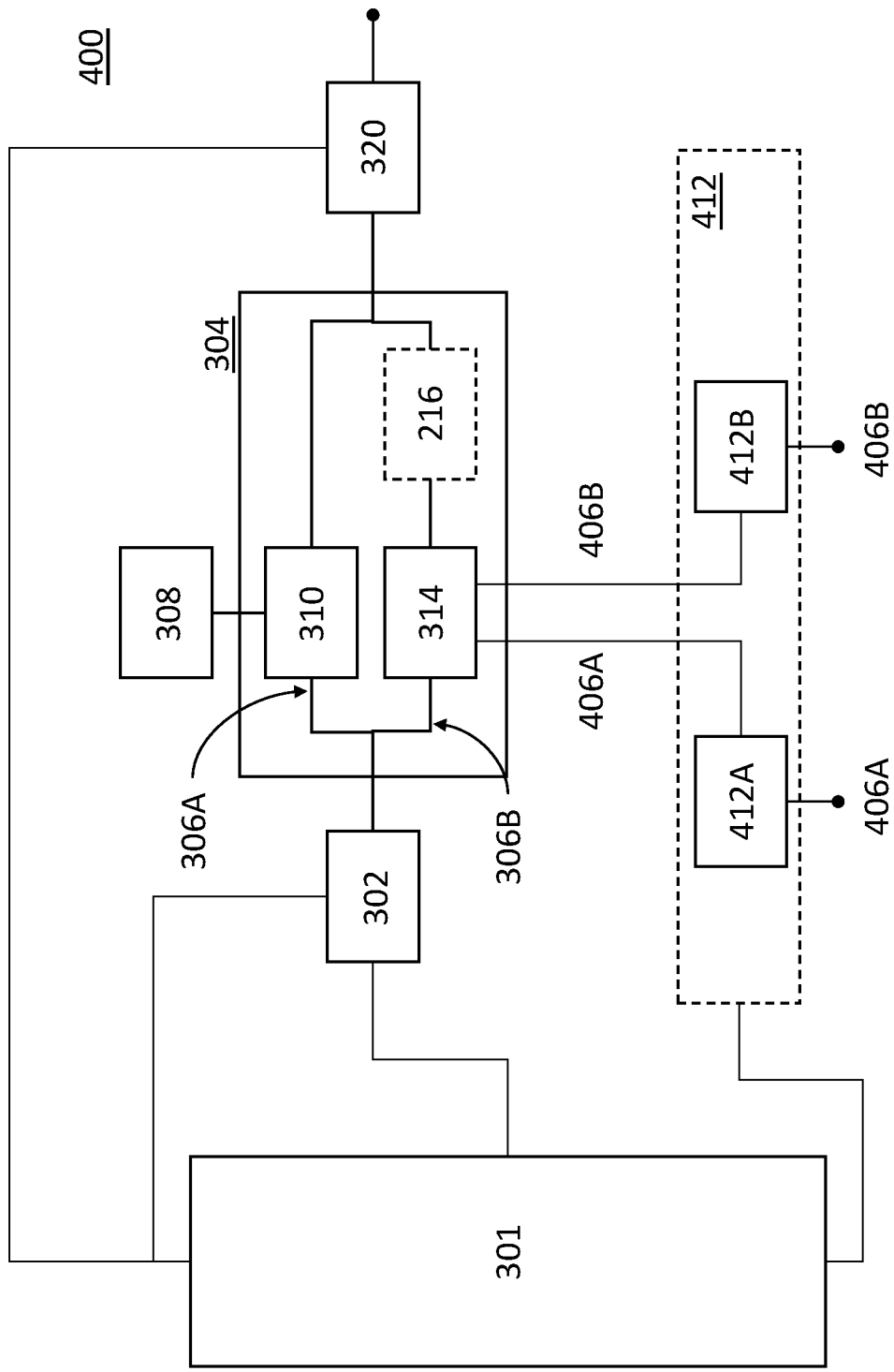
FIG. 4A is a schematic diagram of a receiving/mixer side 400 according to another embodiment.
Figure 4B:
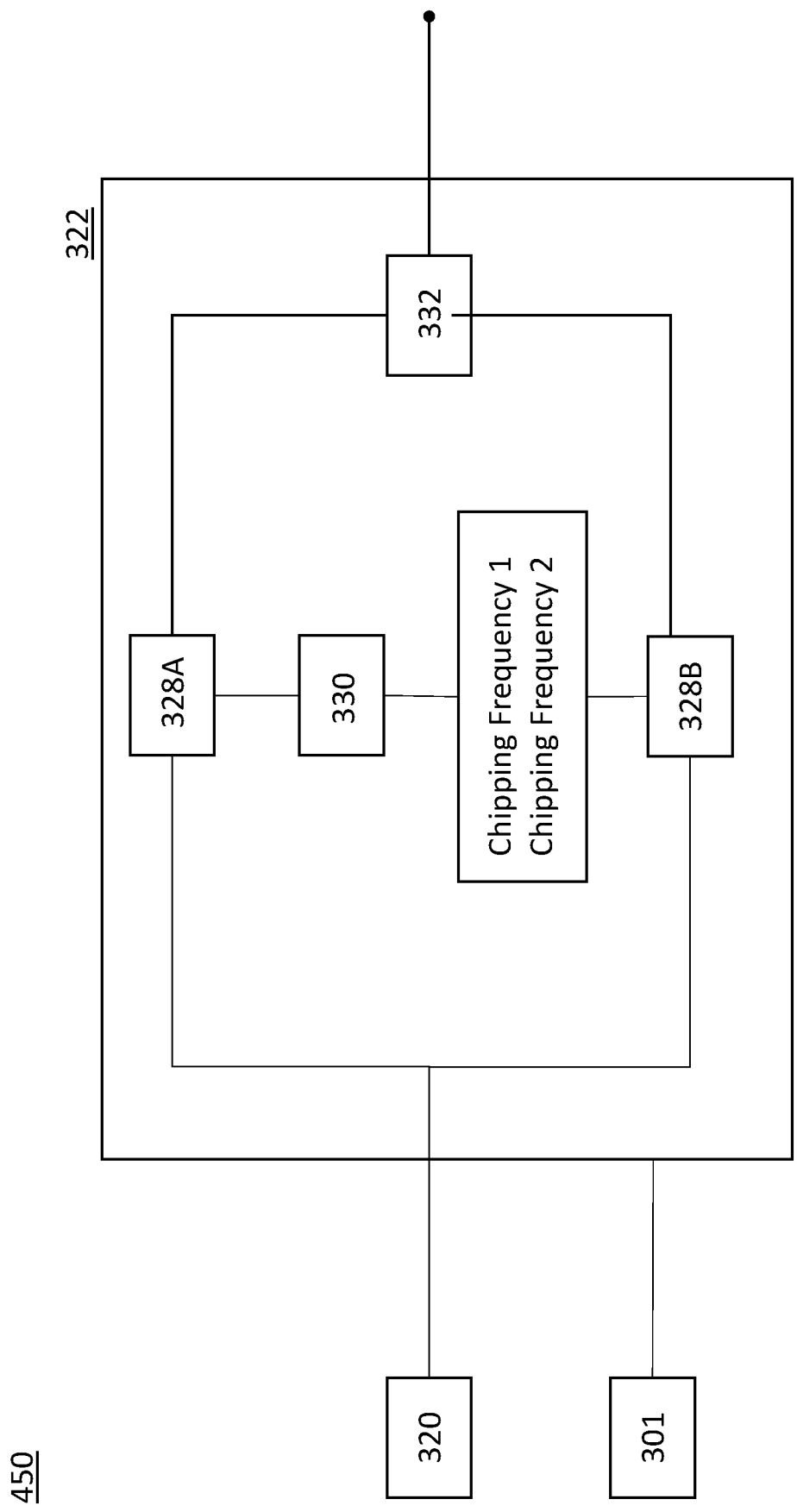
FIG. 4B is a schematic diagram of a dechipping/image rejection side 450 of a receiver system according to yet another embodiment.

FIG. 4A is a schematic illustration of a receiving/mixer side 400 according to another embodiment. The receiving/mixer side 400 shown in FIG. 4A is substantially the same except for the signal generator 412 and the control thereof by controller 301. For brevity, a detailed discussion of components shown in FIG. 4A which are the same as those shown FIG. 2 or FIG. 3A is omitted here. In FIG. 4A, controller 301 provides signal generator 412 with unique frequency offsets corresponding to the number of LO tones to be used. For example, if two encoded LO tones are to be used, controller 301 provides two frequency offsets to signal generator 412. These frequency offsets, called chipping frequencies, respectively shift the frequency of the LO tones by a unique amounts. As a result, each LO tone has a unique offset which effectively transforms the LO tones into coded LO tones 406A and 406B. To recover a particular sideband, the corresponding chipping frequency is provided to the DI rejector 322 by controller 301, as shown in FIG. 4B, and then I/Q image rejection as discussed above is performed to isolate and maximize signals corresponding to the desired subband. Having described systems for downconverting higher frequency subbands to a lower frequency bandwidth and then isolating, or maximizing, signal(s) of interest corresponding to one high frequency subband while suppressing signals corresponding to the other high frequency subbands the operation an exemplary embodiment corresponding to FIGS. 4A and 4B will be described below in reference to FIGS. 5, 6, and 7A-D.

Figure 5:
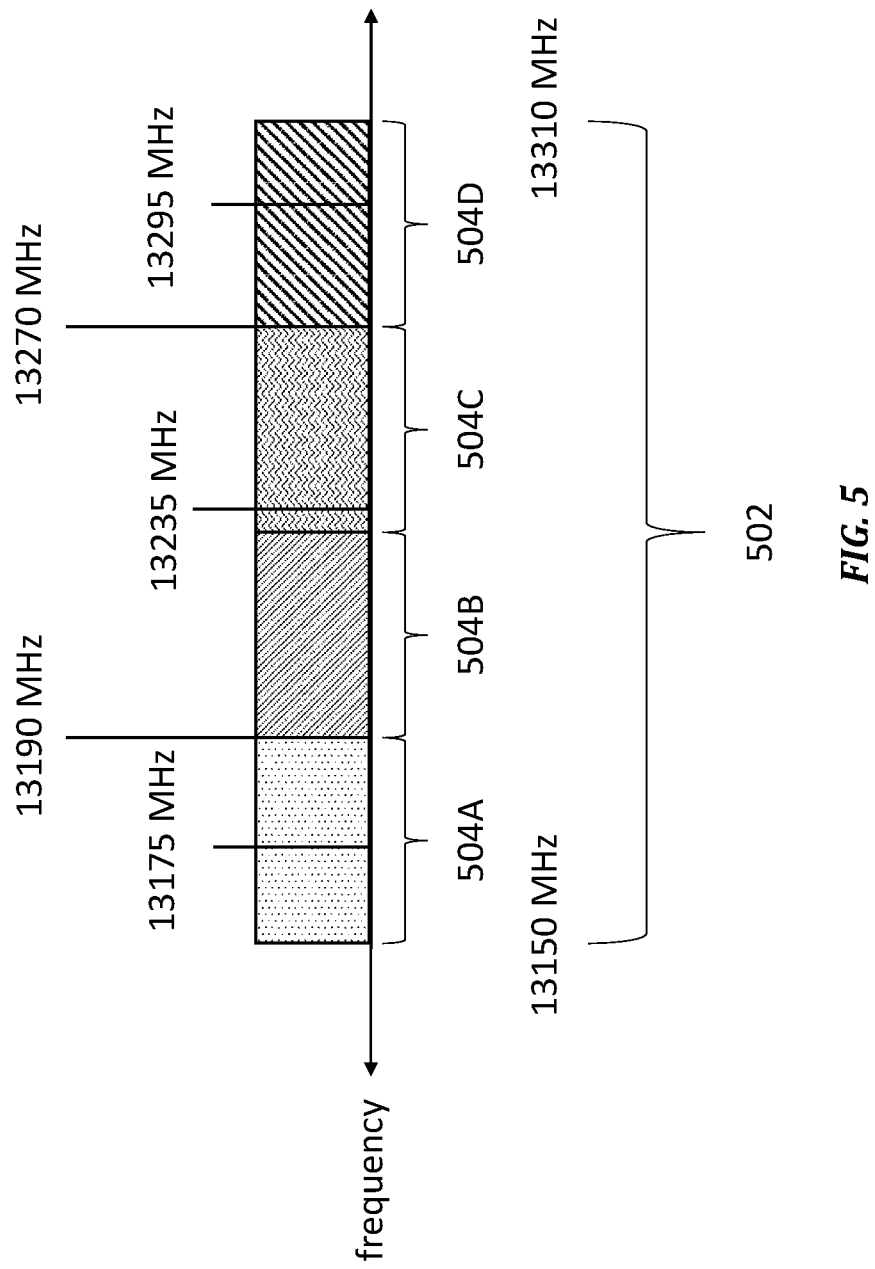
FIG. 5 is an illustration of signals within a certain bandwidth according to one embodiment.

FIG. 5 is an illustration of signals within a bandwidth 502. These signals are merely exemplary and designed to show the function of this embodiment. Bandwidth 502 spans a frequency range of 13150 MHz to 13310 MHz, squarely within the microwave frequency range. Within this frequency range are two local oscillator tones 13190 MHz and 13270 MHz that are evenly spaced apart, each defining an upper and lower sideband that is adjacent to the local oscillator tone. Thus, the local oscillator tone at 13190 MHz has two sidebands 504A and 504B. The local oscillator tone at 13270 MHz also has two sidebands 504C and 504D. Also included is another tone at 13235 MHz. Each of the sidebands 504A-504D has a bandwidth of 40 MHz. For purposes of this illustration, the local oscillator tones at 13190 MHz and 13270 MHz were single-sideband modulated with a 320 MHz chipping frequency and a 160 MHz chipping frequency, respectively, in the manner described above. Namely, controller 301 provided the chipping frequencies to signal generator 412 which, in turn, shifted the frequencies of the local oscillators in accordance with the received chipping frequencies. The now shifted local oscillators are output as coded (i.e., uniquely frequency shifted) LO tones 406A and 406B to the DDMZM 304 and modulated onto arm 306B by modulator 314. The signals-of-interest at 13175 MHz and 13295 MHz, and the tone at 13235 MHz within bandwidth 502 were received by receiver 308 and modulated onto arm 306A of the DDMZM 304 by modulator 310. The output of DDMZM 304 is provided to photodetector 320 where the optical signal is converted into an electrical signal at a lower frequency range, as illustrated in FIG. 6.

Figure 6:
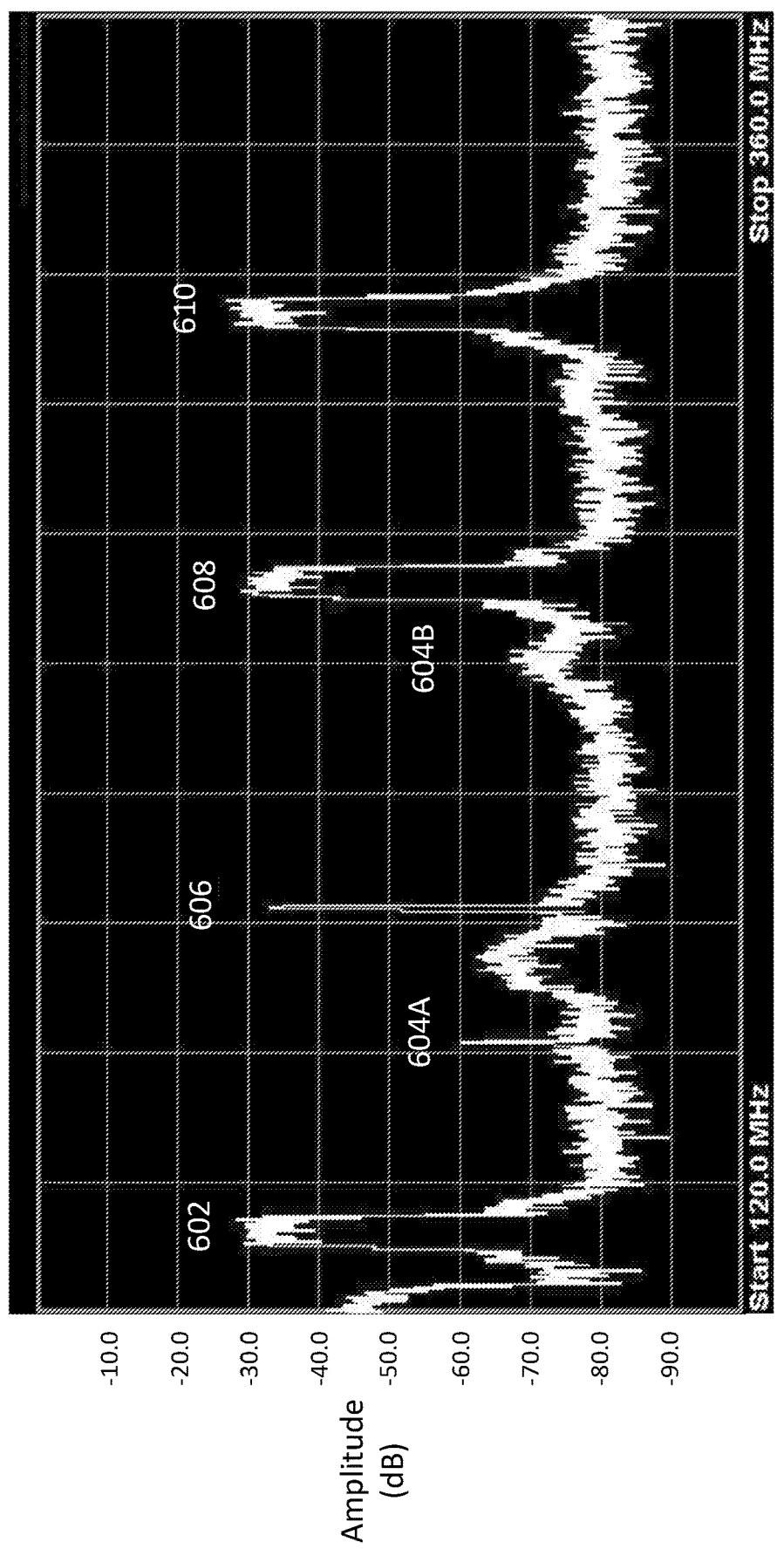
FIG. 6 is a frequency domain image of the output of a photodetector according to one embodiment.

FIG. 6 is a frequency domain image of the output of photodetector 320, before the output is passed to the DI rejector 322. As shown in FIG. 6, the output of photodetector 320 spans a frequency range of 120-360 MHz. In other words, subbands 504A-D and the signals contained therein have been folded into an intermediate frequency bandwidth (IFBW) spanning 120-360 MHz. Table 1 below shows the relationship between peaks in FIG. 6 and the signals/tones in FIG. 5.

| Element Identifier (Frequency)-FIG. 6 | Signal/Tone in FIG. 5 | Description |
| --- | --- | --- |
| 602-135 MHz | 13295 MHz | Signal of Interest |
| 604A & 604B-180 MHz | N/A | Harmonics of Signals of Interest beating against 13235 MHz tone |
| 606-195 MHz | 13235 MHz | Tone |
| 608-255 MHz | 13175 MHz | Copy |
| 610-305 MHz | 13175 MHz | Signal of Interest |

As discussed above, the output of photodetector 320 is provided to a DI rejector 322. Controller 301, in the embodiment corresponding to FIGS. 4A and 4B, provides one of the chipping frequencies to DI rejector 322 depending upon which sidebands are to be resolved. As described above, the output of photodetector 320 is split and each copy is mixed with an in-phase (I) or quadrature phase (Q) version of the chipping frequency provided by Controller 301, bringing the corresponding upper and lower sidebands of the corresponding LO tone down to the final intermediate bandwidth. These were then combined in the low-frequency 90-degree combiner 332 to alternately reject one or the other sideband depending on whether the Q phase is set to 90° or 270°. FIGS. 7A-D are illustrative.

Figure 7A:
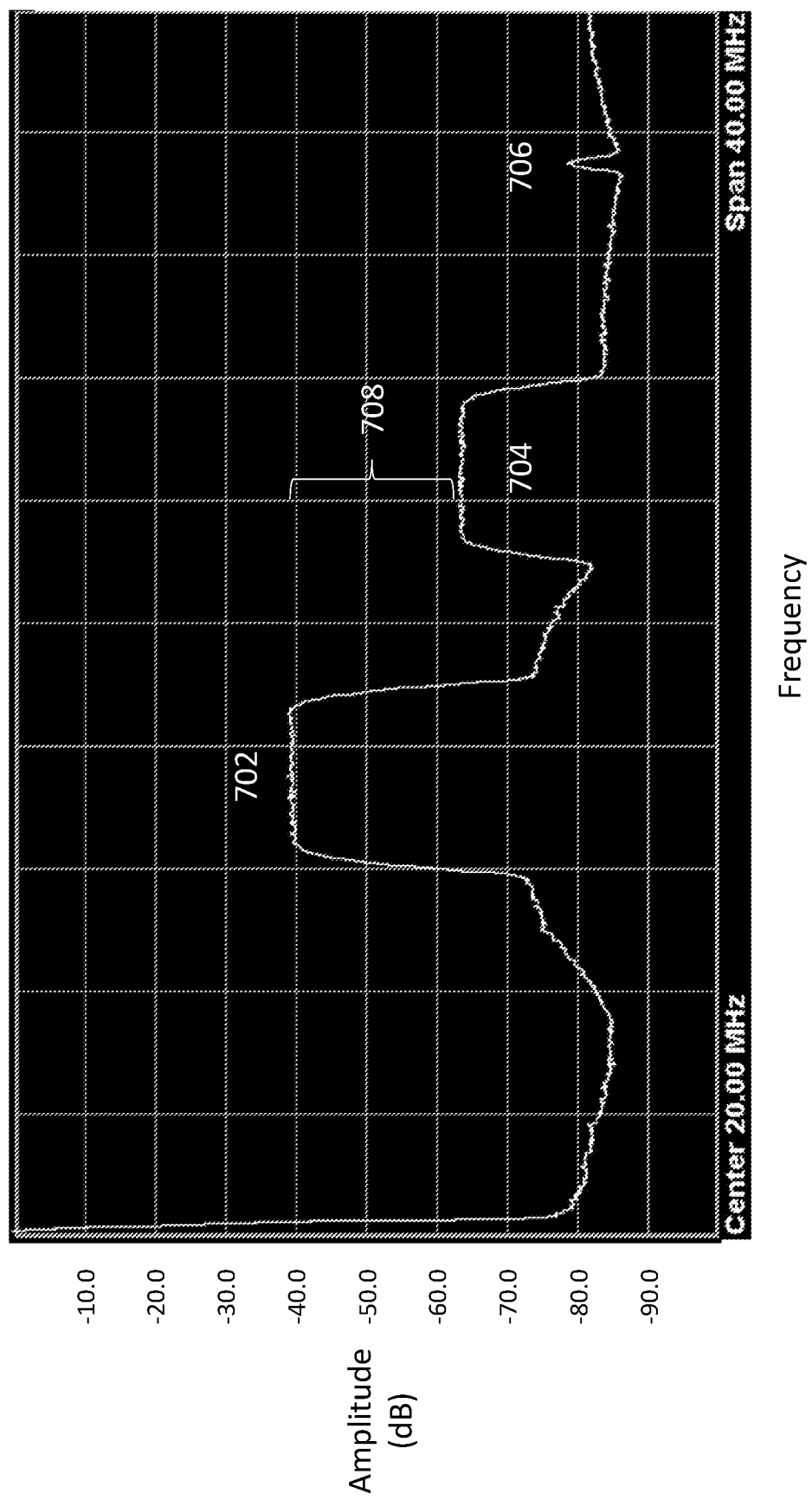
FIGS. 7A-D show the outputs of a dechipping/image rejector, according to one embodiment, depending upon which chipping code or chipping frequency is provided to the dechipping/image rejector and whether the Q phase is 90° or 270°.

FIGS. 7A-D show the output of DI rejector 322 depending upon which chipping frequency is provided to DI rejector 322 and whether the Q phase is 90° or 270°. In FIG. 7A, the first chipping frequency, 320 MHz, is provided to DI rejector 322, and the Q phase is set to 90°. This configuration is intended to discriminate the lower sideband 504A of the 13190 MHz LO, which contains a signal-of-interest at 13175 MHz. As shown in FIG. 7A, the signal-of-interest 702 is translated to approximately 15 MHz and signals 704 and 706 from the other sidebands 504C and 504D that are folded into this bandwidth and which are not dechipped in this configuration are significantly suppressed. As indicated by range 708, these other signals are suppressed by greater than 20 dB.

Figure 7B:
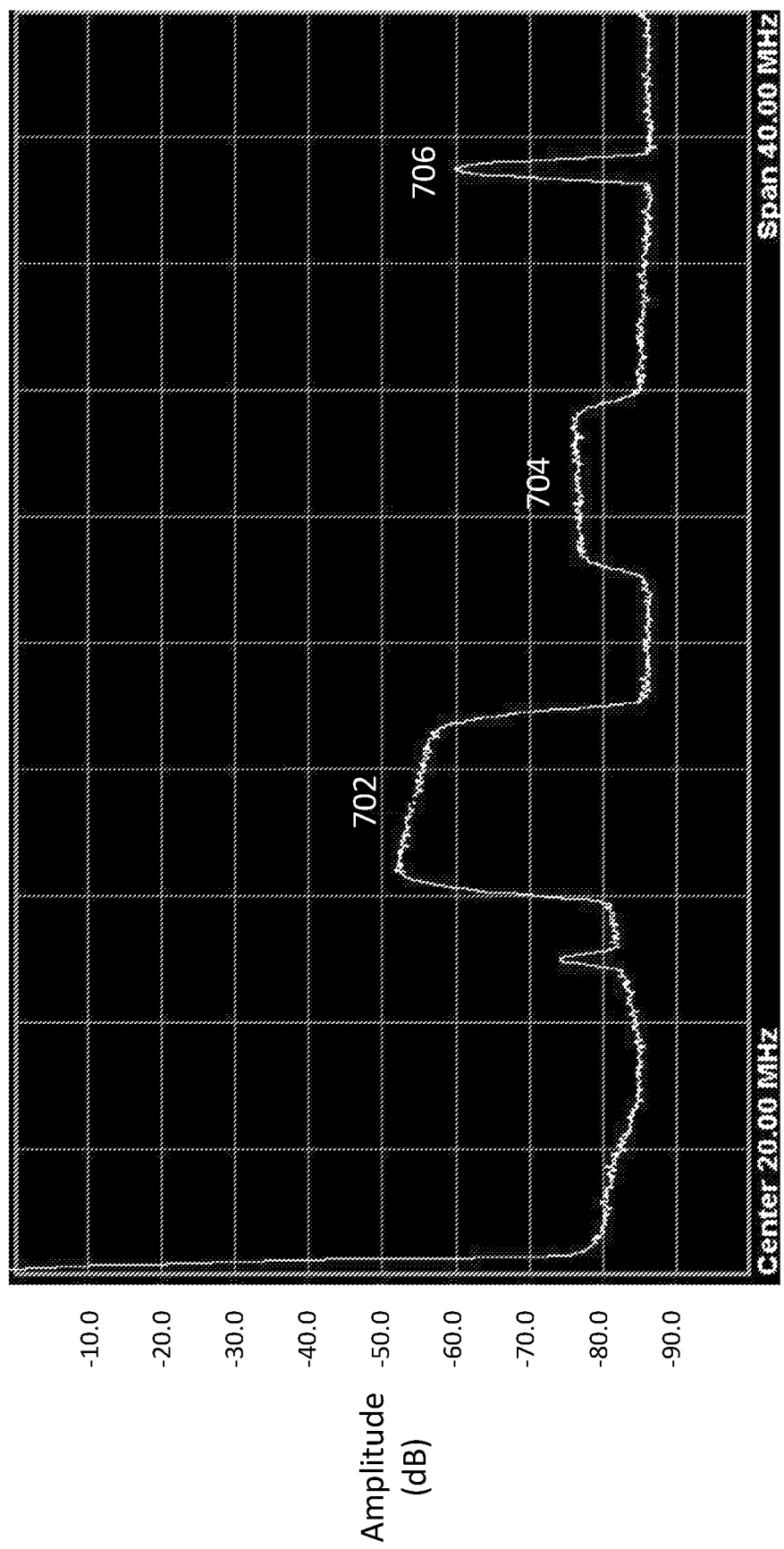

In FIG. 7B, the first chipping frequency, 320 MHz, is again provided to the DI rejector 322, but the Q phase is set to 270°. This configuration is intended to discriminate the upper sideband 504B of the 13190 MHz LO, which does not contain any signals-of-interest. It should be noted that the signal-of-interest from the lower sideband 504A appears in FIG. 7B but has been suppressed by approximately 15 dB compared to FIG. 7A. Like with FIG. 7A, signals 704 and 706 from the other sideband 504C and 504D remain significantly suppressed.

Figure 7C:
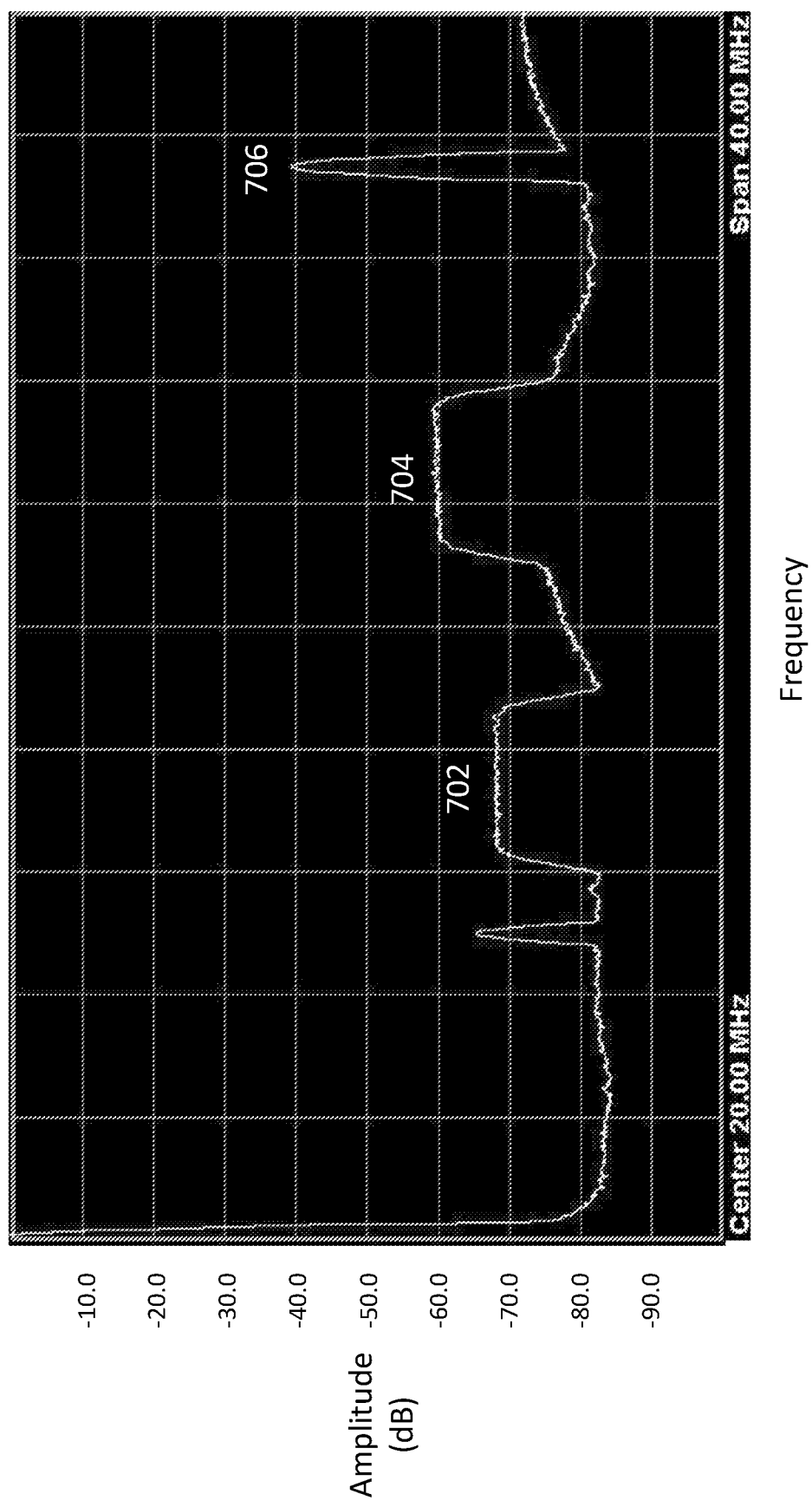

In FIG. 7C, the second chipping frequency, 160 MHz, is provided to the DI rejector 322 and the Q phase is set to 270°. This configuration is intended to discriminate the lower sideband 504C of the 13270 MHz LO, which contains the tone at 13235 MHz. As shown in FIG. 7C, signal 706 corresponding to the tone at 13235 MHz is approximately 20 dB stronger than the signals-of-interest 702 and 704 from the other sidebands.

Figure 7D:
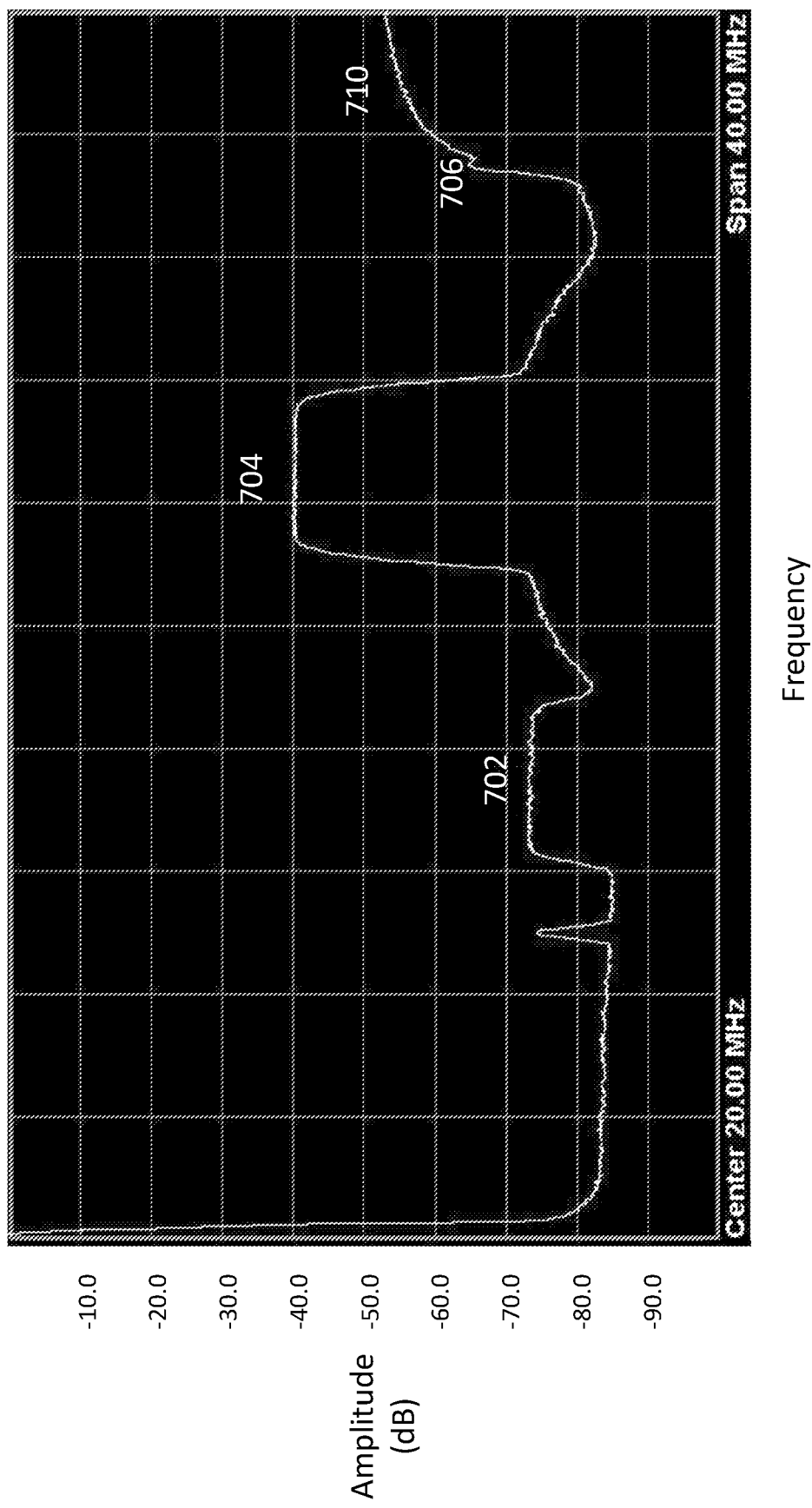

In FIG. 7D, the second chipping frequency, 160 MHz, is provided to the DI rejector 322 and the Q phase is set to 90°. This configuration is intended to discriminate the upper sideband 504D of the 13270 MHz LO, which contains a signal-of-interest at 13295 MHz. As shown in FIG. 7D, signal 704 corresponding to the signal-of-interest at 13295 MHz is approximately 15 dB stronger than signal 710 created by the signals-of-interest beating against each other. Note that signal 710 partially overlaps with signal 706 corresponding to the tone at 13235 MHz. The signal 702 corresponding to the signal-of-interest in sideband 502A is well suppressed relative to the signal 704.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for downconverting high frequency subbands and recovering one or more signals-of-interest, comprising:
    a controller constructed to output chipping frequencies;
    a signal generator constructed to receive the chipping frequencies and generate a plurality of local oscillator tones each of which is shifted by a respective chipping frequency;
    an optical source constructed to output an optical signal;
    a dual-drive mach zehnder modulator that includes:
        a first arm formed from a first optical waveguide and constructed to receive the optical signal from the optical source,
        a second arm formed from a second optical waveguide and constructed to receive the optical signal from the optical source,
        a first modulator constructed to receive an input signal that includes one or more signals within a bandwidth that includes a plurality of high frequency subbands and modulate the input signal onto the optical signal propagating through the first arm to form a first modulated optical signal, and
        a second modulator constructed to receive the plurality of local oscillator tones from the signal generator and modulate the plurality of local oscillator tones onto the optical signal propagating through the second arm to form a second modulated optical signal,
        wherein the dual-drive mach zehnder modulator is constructed to output an output signal which is a combination of the first modulated optical signal and the second modulated optical signal;
    a photodetector constructed to receive the output signal from the dual-drive mach zehnder modulator and generate a corresponding electrical signal; and
    a dechipping/image rejector constructed to receive the electrical signal from the photodetector and one of the chipping frequencies from the controller and output a signal that maximizes one or more signals corresponding to one of the plurality of high frequency subbands while suppressing one or more signals corresponding to other subbands of the plurality of high frequency subbands.

2. The apparatus of claim 1, further comprising:
    a receiver constructed to receive the input signal and provide the input signal to the first modulator.

3. The apparatus of claim 2, wherein the input signal received by the receiver is modulated on the optical signal propagating through the first arm by applying an electric field to the first arm in accordance with the input signal to modify the refractive index of the first optical waveguide material.

4. The apparatus of claim 1, wherein the optical signal output by the optical source is a continuous wavelength.

5. The apparatus of claim 1, wherein the first optical waveguide and the second optical waveguide comprise an electro-optic polymer waveguide material.

6. The apparatus of claim 1, wherein the first optical waveguide and the second optical waveguide comprise lithium niobate.

* * * * *